United States Patent [19]
Awano et al.

[11] Patent Number: 5,177,033
[45] Date of Patent: Jan. 5, 1993

[54] SINTERED BODY OF LIGHT TRANSMITTING CORDIERITE AND A METHOD OF PREPARING THE SAME

[75] Inventors: Masanobu Awano; Michihide Machida, both of Nagoya; Hiroyoshi Takagi, Kasugai; Yuzi Hoshi, Funabashi; Masamichi Obitsu, Tokyo, all of Japan

[73] Assignees: Agency of Industrial Science and Technology; Nissan Chemical Industries, Ltd., both of Tokyo, Japan

[21] Appl. No.: 703,865

[22] Filed: May 21, 1991

[30] Foreign Application Priority Data

May 22, 1990 [JP] Japan .................. 2-132258

[51] Int. Cl.$^5$ .......................... C03C 10/08
[52] U.S. Cl. ........................ 501/9; 501/119; 501/122
[58] Field of Search ............ 501/9, 119, 122; 264/65, 66

[56] References Cited

U.S. PATENT DOCUMENTS

| | | | |
|---|---|---|---|
| 4,367,292 | 1/1983 | Sano et al. | 501/119 |
| 4,542,109 | 9/1985 | Pacto | 501/97 |
| 4,587,067 | 5/1986 | Agrawal et al. | 501/119 |
| 4,711,860 | 12/1987 | Gadkaree et al. | 501/97 |
| 4,855,259 | 8/1989 | Claussen et al. | 501/105 |
| 4,888,314 | 12/1989 | Bernier et al. | 501/9 |
| 5,019,293 | 5/1991 | Burlitch | 252/313.1 |
| 5,030,592 | 7/1991 | Komarneni et al. | 501/9 |

FOREIGN PATENT DOCUMENTS

| | | |
|---|---|---|
| 237253 | 9/1987 | European Pat. Off. . |
| 261744 | 3/1988 | European Pat. Off. . |
| 332393 | 9/1989 | European Pat. Off. . |
| 334760 | 9/1989 | European Pat. Off. . |

OTHER PUBLICATIONS

Nogami, et al "Preparation of Cordierite Glass by the Sol-Gel Process" Jrnl. of Material Science, vol. 24, No. 12, pp. 4339-4442.

Paulick et al "Ceramic Powders From Metal Alkoxide Precursors", Advances in Ceramics, vol. 21, pp. 121-129.

Primary Examiner—Karl Group
Assistant Examiner—Chris Gallo
Attorney, Agent, or Firm—Oliff & Berridge

[57] ABSTRACT

A light transmitting sintered body of cordierite has a composition equal or close to the stoichiometric composition of cordierite which is represented as $2MgO \cdot 2Al_2O_3 \cdot 5SiO_2$, consists mainly of a phase of cordierite crystals, and has a total transmittance of at least 20%. A method of preparing it is also disclosed.

7 Claims, 1 Drawing Sheet

SINTERED BODY OF LIGHT TRANSMITTING CORDIERITE AND A METHOD OF PREPARING THE SAME

BACKGROUND OF THE INVENTION

1. Field of the Invention

This invention relates to a sintered body of cordierite capable of transmitting light, and a method of preparing the same. More particularly, it is concerned with an improved sintered body of light transmitting cordierite which can be used for making not only a carrier for a catalyst exposed to a high temperature, or the like, but also a light emitting tube, the window of a high temperature furnace, a reaction tube for a light concentrating oven, or the like.

2. Description of the Prior Art

For making the window of a high temperature furnace, a reaction tube for a light concentrating oven, or any similar part of an apparatus that is required to have heat resisting and light transmitting properties, it has been usual to use transparent quartz for any part exposed to a temperature not exceeding 1000° C., and light transmitting alumina for any part exposed to a higher temperature. There has, however, been a limit to the temperature at which alumina can be used, unless its protection against heat is possible, since it is low in thermal shock resistance because of its relatively high coefficient of thermal expansion [$8.5 \times 10^{-6}$ (/° C.)]. Transparent mullite having a thermal expansion coefficient of $4.0 \times 10^{-6}$ (/° C.) has recently been developed, and has been practically the only alternative light transmitting ceramic material that can be used in the high temperature range in which transparent quartz cannot. It has, therefore, been necessary to explore another ceramic material having a high level of heat resistance, a low coefficient of thermal expansion, and an improved light transmitting property.

Cordierite can withstand a maximum temperature of 1400° C. and has a coefficient of thermal expansion which is as low as $2.0 \times 10^{-6}$ (/° C.). Therefore, it has been used for making not only ordinary porcelain ware, but also devices, parts or components of which high thermal shock resistance is required, e.g. a carrier (honeycomb type carrier) for a catalyst for purifying the exhaust gas of an automobile. Studies are also under way for exploring the possibility of using cordierite for applications in which its high insulating property at high temperatures may be useful.

Cordierite ceramics are, however, difficult to sinter. The liquid-phase sintering thereof involves a great deal of difficulty in the control of the temperature at which the liquid phase is formed. The pure phase, which is equal to the stoichiometric composition, is very difficult to densify, since its densifying temperature has an allowable variation of only about 10° C. Moreover, the precipitation of a different phase, such as of mullite or spinel, is likely to occur.

It is generally understood that a polycrystalline sintered ceramic body is capable of transmitting light, or transparent if it satisfies the following requirements:

(1) A polycrystalline body composed of crystal grains having little optical anisotropy, or a transparent body having a high level of regularity in crystalline orientation;

(2) A densely and uniformly sintered body not having any lattice defect, impurity phase, segregation, voids, etc. in the crystal grains, or grain boundaries that may cause the scattering of light, or a body having only lattice defects, etc. which are sufficiently small, as compared with the wavelength of visible light, not to cause any scattering;

(3) A body having an appropriate grain size and not having so large a number of grain boundaries as to cause the scattering of light; and (4) A sintered body having a smooth surface not causing any scattering of light.

Cordierite crystals belong to the orthorhombic system (low temperature type cordierite), or the hexagonal system (high temperature type). They are optically anisotropic and fail to satisfy the requirement as stated at (1) above. It is, therefore, necessary to realize a sintered body having an improved light transmitting property by eliminating from it any of the factors causing the scattering of light as stated at (2) to (4) above. In other words, it is necessary to make a sintered body which is highly dense and homogeneous.

In order to obtain a sintered body which is highly dense and homogeneous, it has been usual to (a) prepare a fine powder which is of high purity and homogeneous, and (b) sinter it into a body having an appropriately controlled microstructure. A number of methods, such as coprecipitation, a method using metal alkoxides, and spray drying, have been employed for preparing a powder. Referring by way of example to the method using a metal alkoxide, it has been found to be capable of forming an ultrafine homogeneous powder which can be sintered at normal pressure to yield a sintered body of high density. No sintered product has, however, been found to be free of any precipitated phase of a different substance, or any voids. It has been impossible to make by sintering at normal pressure or in atmosphere sintering any product that is satisfactory in its freedom of pores. After all, it has hitherto been impossible to produce a sintered body of cordierite having a high level of light transmittance.

SUMMARY OF THE INVENTION

Under these circumstances, we, the inventors of this invention, have found that it is possible to produce a sintered body of cordierite not having any voids, or other defect, but exhibiting a high level of light transmitting property as represented by a total transmittance of at least 20%, if a powder is prepared by sol gelation or coprecipitation, and is sintered at normal pressure into a body having nearly its theoretical density, while no phase of crystals of any different substance is allowed to precipitate, and if the sintered body is subjected to hot isostatic pressing (HIP).

It is, therefore, an object of this invention to provide a sintered body of cordierite having a high level of light transmitting property.

This object is attained by a sintered body of cordierite having a composition equal or close to the stoichiometric composition of cordierite which is represented as $2MgO.2Al_2O_3.5SiO_2$, consisting mainly of a phase of cordierite crystals, and having a total transmittance of at least 20%.

It is another object of this invention to provide a method of preparing a sintered body of cordierite having a high level of light transmitting property as represented by a total transmittance of at least 20%.

This object is attained by a method which comprises preparing a sintered body having a composition equal or close to the stoichiometric composition of cordierite which is represented as 2MgO.2Al$_2$O$_3$.5SiO$_2$, and consisting mainly of a phase of cordierite crystals, and subjecting it to hot isostatic pressing at a temperature of 1350° C. to 1450° C. and a pressure of 1000 to 2000 atmospheres.

Other features and advantages of this invention will become apparent from the following description and the accompanying drawing.

DETAILED DESCRIPTION OF THE INVENTION

Figure 1:
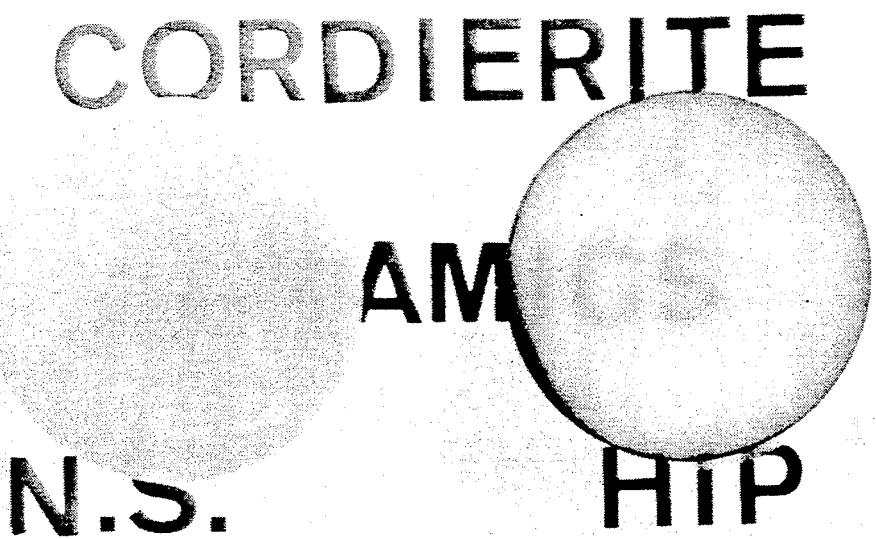
FIG. 1 is a photograph showing the crystal structure of a light transmitting sintered body of cordierite embodying this invention.

It has hitherto been usual practice to use natural materials, such as kaolin, talc, clay and silica, for the synthesis of cordierite. According to this invention, it is necessary to use materials each having a purity of at least 99.5% in order to produce cordierite which does not contain impurities causing the scattering of light.

It is, therefore, important to prepare cordierite having a composition equal or close to its stoichiometric composition which consists of 22.2 mol % of MgO, 22.2 mol % of Al$_2$O$_3$ and 55.6 mol % of SiO$_2$. In the context of this invention, cordierite having a composition close to its stoichiometric composition comprises 22.2 minus 2 to 22.2 plus 3 mol % of MgO, 22.2 minus 4 to 22.2 plus 1 mol % of Al$_2$O$_3$, and 55.6 minus 4 to 55.6 plus 1 mol % of SiO$_2$.

Coprecipitation, a method using metal alkoxides, or spray drying can, for example, be employed for preparing a uniform mixture of materials for cordierite having a composition as hereinabove defined.

It is also possible to prepare a mixed powder by adding a magnesium salt to a mixture of silica and alumina sols and causing the gelation of the sols and coprecipitation simultaneously. More specifically, acid stabilized sols of silica and alumina and an aqueous solution of magnesium nitrate are mixed in proportions enabling the formation of cordierite having a composition equal or close to its stoichiometric composition, and ammonium carbonate is added to their mixture to render the sols strongly alkaline rapidly to cause their gelation, while the magnesium salt is simultaneously caused to settle down. If the resulting gel is collected by filtration, and dried, it is possible to obtain a dry powder in which the materials form a homogeneous mixture as examined on a microscopic scale. The powder is calcined at a temperature of 1200° C. to 1300° C., and after the calcined product has been crushed and grinded, the resulting powder is compacted. The resulting compact is sintered at normal pressure and a temperature of 1420° C. to 1450° C. in the air. The sintered product has a transmittance of about 10 to 20% if its density is close to the theoretical value. The sintered product is, then, subjected to hot isostatic pressing at a temperature of 1350° C. to 1450° C. and a pressure of 1000 to 2000 atmospheres in an argon gas atmosphere, whereby a sintered body having a sintered density virtually equal to the theoretical level is obtained. The sintered body has a highly dense and uniform microstructure which is free of any remaining pore and is substantially free of any segregated phase at grain boundary.

The sintered body of cordierite according to this invention exhibits a total transmittance of at least 20% for visible light, which no known similar product has been able to achieve, as measured by a customary method using, for example, an HTR meter supplied by Nippon Precision Industrial Co., Ltd.

The sintered body of this invention is, moreover, superior to any known similar product in mechanical and electrical properties, such as bending strength, fracture toughness, and insulating property at high temperatures, owing to its improved degree of sintering properties.

The sintered body of this invention is useful for a wide variety of applications of which heat resistance and light transmitting property are both required, and for which no adequate material has hitherto been available. Moreover, the improved properties of cordierite of which the sintered body of this invention is composed make it suitable for a still wider scope of use as a material for any device, part or component that may be exposed to high temperatures.

The invention will now be described more specifically with reference to a few example thereof.

EXAMPLE 1

A colloidal solution of cordierite having its stoichiometric composition was prepared by dissolving 7.2 g of magnesium hydroxide (as a guaranteed reagent) in 200 ml of a 7N solution of nitric acid, and adding 114.9 g of alumina sol (product of Nissan Chemical Co. sold as "Alumina Sol 200") and 86.7 g of colloidal silica (product of the same company sold as "Snowtex 0"), while stirring the solution. 1000 ml of a 6N solution of ammonium carbonate was added to the colloidal solution to cause gelation and coprecipitation to take place. The resulting gel was dried, and calcined at a temperature of 1200° C. to 1300° C. for an hour. The calcined product was subjected to 12 hours of crushing in a pot mill. The resulting powder was uniaxially and isostatically compacted, and was sintered at a temperature of 1450° C. and normal pressure for an hour. The sintered product was subjected to hot isostatic pressing at a temperature of 1420° C. and a pressure of 2000 kgf/cm$^2$ for an hour in an argon gas atmosphere, while a graphite heater was used for heating it.

The product had a density of 2.54 g/cm$^3$ as determined by the Archimedes' method, a thermal expansion coefficient of $1.6 \times 10^{-6}$/° C. as measured between room temperature and 1200° C., and a total transmittance of 40% for visible light as measured by an HTR meter supplied from Nippon Precision Engineering Co., while the sintered product before hot isostatic pressing had had a total transmittance of only 5%.

Attention is now directed to FIG. 1 comparing the disk-shaped sintered products as sintered before HIP and as subjected to HIP, respectively, with respect to transmittance, or transparency. The product as sintered, which had a total transmittance of 5%, is shown in the left half of FIG. 1, while the product as subjected to HIP, which had a total transmittance of 40%, appears in the right half thereof. As is obvious from FIG. 1, the product as subjected to HIP according to this invention was so good in transmittance that the alphabetical letters I, C and S could be read through it, while the product as sintered was so bad in transparency that no letter could be seen through it.

EXAMPLE 2

Metal alkoxides were used as the starting materials. A solution containing 52.1 g of ethyl silicate in a mixed solvent prepared by mixing 200 ml of ethanol and water, and containing 0.01 mol of hydrochloric acid, was heated at 70° C. for an hour under stirring, whereby the ethyl silicate was partially hydrolyzed. Added to the resulting solution was a solution which had been obtained by adding 40.95 g of aluminum isopropoxide and 11.4 g of magnesium diethoxide to a mixed solvent consisting of 500 ml of butanol and 400 ml of dimethoxyethanol, and mixing them for two hours under stirring. The mixed solution was heated at 75° C. for three hours under reflux, and the solvent was removed from the solution by evaporation, yielding a powder as a precursor for cordierite having the stoichiometric composition.

The process of EXAMPLE 1 was thereafter followed for making a sintered and hot isostatically pressed product, except that the powder was calcined at a temperature of 800° C. to 900° C. for 12 hours, and sintered at 1420° C. The product had a density of 2.52 g/cm$^3$ as determined by the Archimedes' method, a thermal expansion coefficient of $1.7 \times 10^{-6}$/° C. as measured between room temperature and 1200° C., and a total transmittance of 40%.

What is claimed is:

1. A light transmitting sintered body of cordierite having a composition equal or close to the stoichiometric composition of cordierite which is represented as $2MgO.2Al_2O_3.5SiO_2$, consisting mainly of a phase of cordierite cyrstals, and having a total transmittance of at least 20%.

2. A sintered body as set forth in claim 1, wherein said cordierite comprises 20.2 to 25.2 mol % of MGO, 18.2 to 23.2 mol % of $Al_2O_3$, and 51.6 to 56.6 mol % of $SiO_2$.

3. A method of preparing a light transmitting sintered body of cordierite comprising:
    making a sintered body having a composition equal or close to the stoichiometric composition of cordierite which is represented as $2MgO.2Al_2O_3.5SiO_2$, consisting mainly of a phase of cordierite crystals, and containing less than 0.5% of impurities; and
    subjecting said body to hot isostatic pressing at a temperature of 1350° C. to 1450° C. and a pressure of 1000 to 2000 atmospheres to produce a cordierite having a total transmittance of at least 20%.

4. A method of preparing a light transmitting sintered body of cordierite comprising:
    making a sintered body from a powder prepared from a mixture of an alumina sol, a silica sol, and a magnesium salt, having a composition equal or close to the stoichiometric composition of cordierite which is represented as $2MgO.2Al_2O_3.5SiO_2$, consisting mainly of a phase of cordierite crystals, and containing less than 0.5% of impurities; and
    subjecting said body to hot isostatic pressing at a temperature of 1350° C. to 1450° C. and a pressure of 1000 and 2000 atmospheres to produce a cordierite having a total transmittance of at least 20%.

5. A method of preparing a light transmitting sintered body of cordierite comprising:
    making a sintered body from a powder prepared from a mixture of an aluminum alkoxide, a magnesium alkoxide, and a silicate, having a composition equal or close to the stoichiometric composition of cordierite which is represented as $2MgO.2Al_2O_3.5SiO_2$, consisting mainly of a phase of cordierite crystals, and containing less than 0.5% of impurities; and
    subjecting said body to hot isostatic pressing at a temperature of 1350° C. to 1450° C. and a pressure of 1000 and 2000 atmospheres to produce a cordierite having a total transmittance of at least 20%.

6. A method according to claim 4, wherein said powder is prepared by sol gelation and coprecipitation.

7. A method according to claim 5, wherein said powder is prepared by coprecipitation with metal alkoxides.

* * * * *